Oct. 28, 1958
J. F. FROLA
2,858,167
LOAD BRAKE MECHANISM
Filed Aug. 30, 1954
3 Sheets-Sheet 2
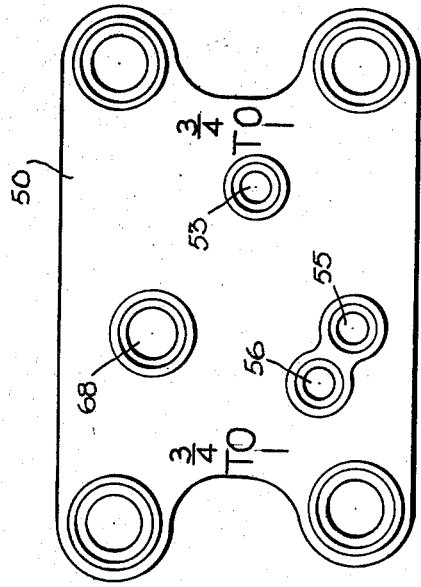
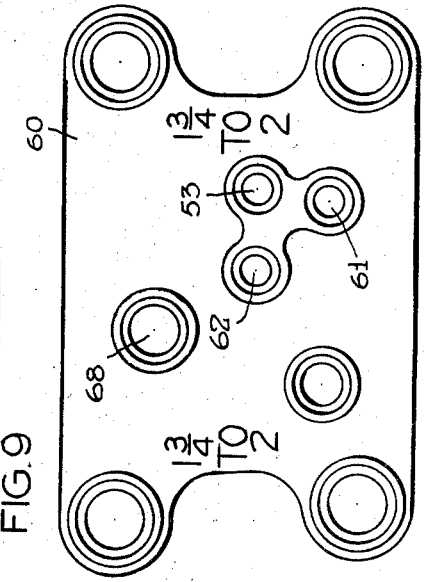
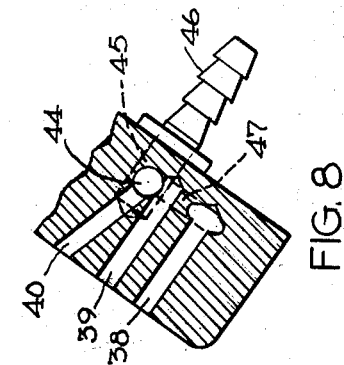
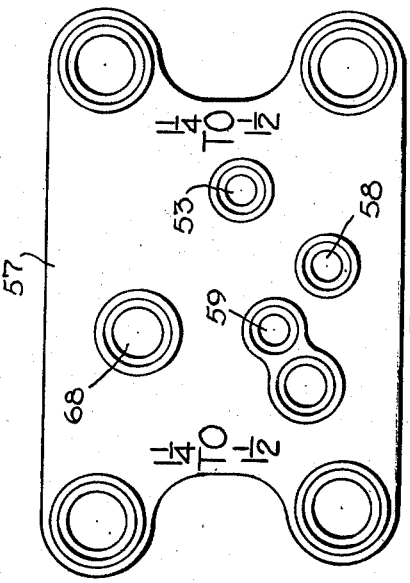
*INVENTOR.*
Joseph F. Frola
BY
*Adelbert A. Steinmiller*
ATTORNEY Oct. 28, 1958 J. F. FROLA 2,858,167
LOAD BRAKE MECHANISM
Filed Aug. 30, 1954 3 Sheets-Sheet 3
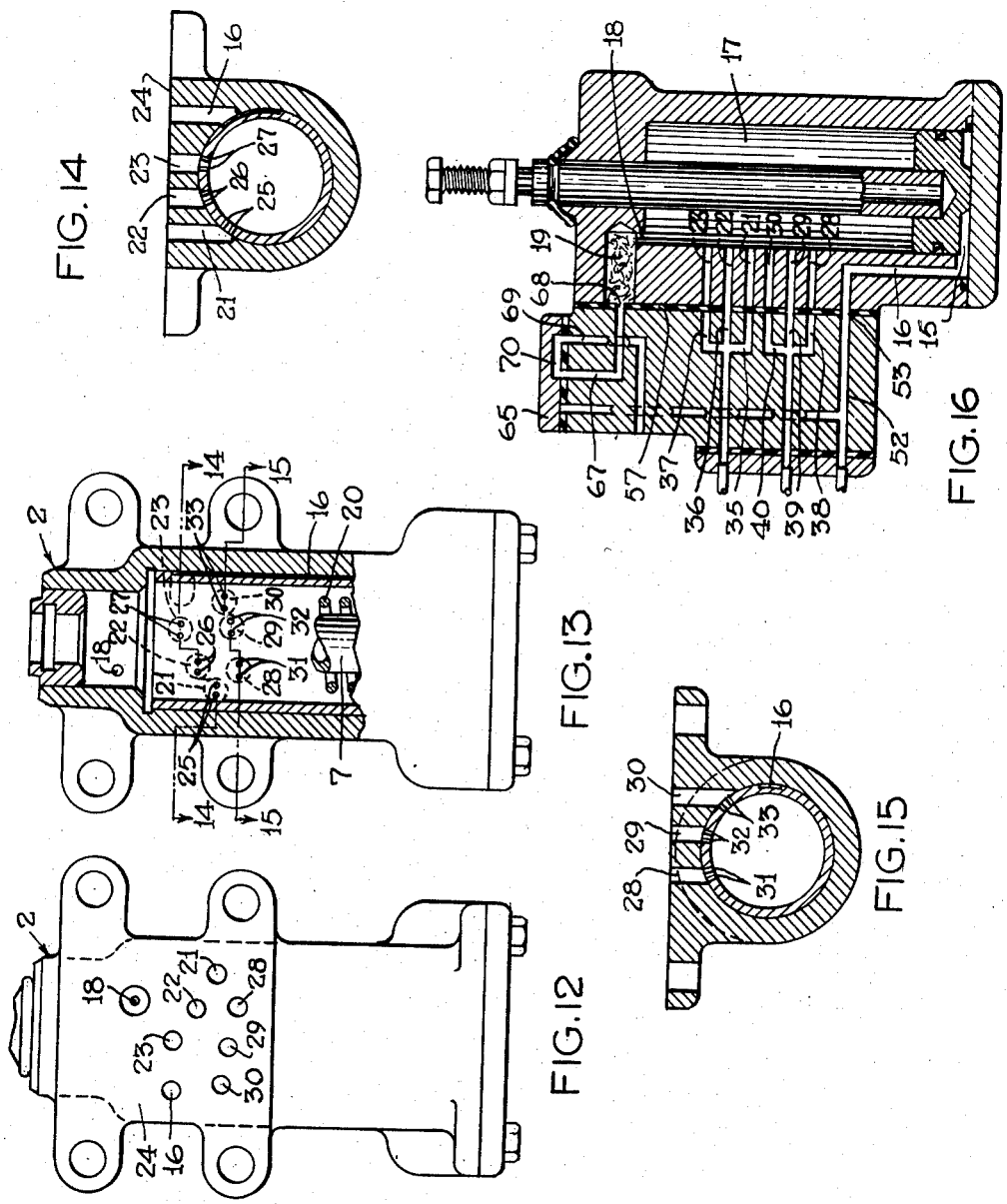
INVENTOR.
Joseph F. Frola
BY
Adelbert A. Steinmiller
ATTORNEY

United States Patent Office 2,858,167
Patented Oct. 28, 1958

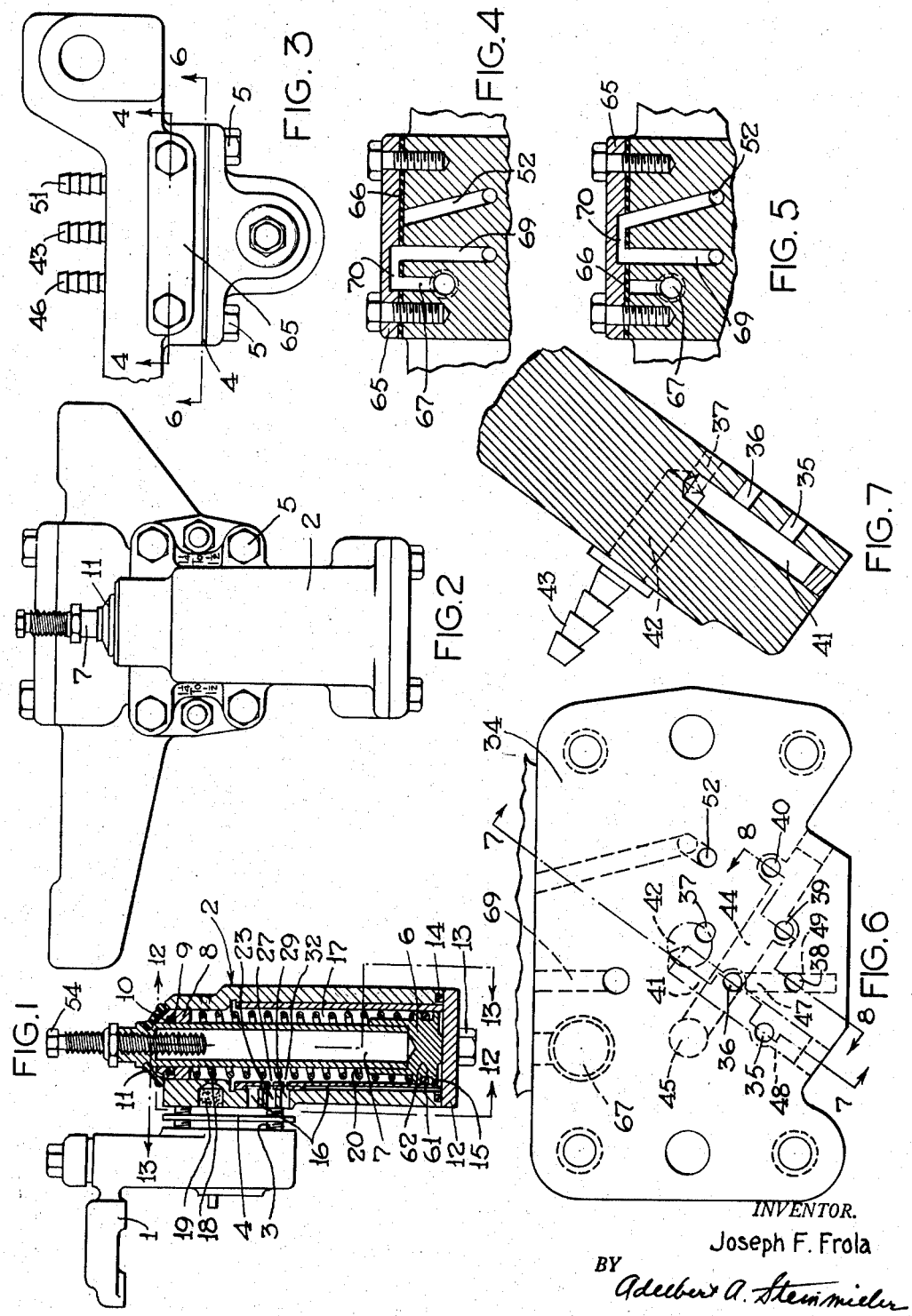

2,858,167

LOAD BRAKE MECHANISM

Joseph F. Frola, Braddock, Pa., assignor to Westinghouse Air Brake Company, Wilmerding, Pa., a corporation of Pennsylvania Application August 30, 1954, Serial No. 452,964

6 Claims. (Cl. 303—22)

This invention relates to load compensating fluid pressure brake equipment for railway vehicles and more particularly to load measuring apparatus for such eqiupment.

In load compensating fluid pressure brake equipment such as that shown in copending patent application Serial No. 437,068, filed June 16, 1954 by Glenn M. Thomas, and assigned to the assignee of the present invention, the deflection of the springs supporting the vehicle body is used as the gauge for determining the weight of the load carried on the vehicle body and thereby the degree of braking required for that particular vehicle. It is well known that the deflection characteristics of the springs on various vehicles in a train vary from vehicle to vehicle, which necessitates a separate adjustment of the weighing gear for each individual vehicle. It is also well known that the body supporting springs, after a period of use take a permanent set which, of course, necessitates a readjustment of the load measuring gear on each individual vehicle. Because of these variations in the amount of spring deflection per unit of weight in different cars, it has been necessary, in order to adjust the selector valve device described in the above identified copending application to the proper setting for a particular load, for car builder and repair shops to carry an extensive stock of load measuring mechanisms, or strut cylinder devices, in order to have a device corresponding to the particular range of spring deflection on the particular car upon which work is being performed.

It is an object of this invention, therefore, to provide a single structure for use as a universal strut cylinder device for the above noted brake equipment which structure may be adapted for use on any car in accordance with its particular known range of spring deflection.

It is also an object of this invention to provide a universal strut cylinder device of the type indicated in the foregoing object, further characterized in being arranged to enable conditioning thereof for testing the load compensating brake equipment notwithstanding the fact that the vehicle may be empty.

It is also an object of my invention to enable use of the novel structure set forth in the foregoing object universally on all cars by a method characterized by the selection of one of a plurality of appropriate gaskets, suited to the spring deflection characteristics of the car, for use in the novel structure.

Other objects and advantages will become apparent from the following detailed description of the invention when taken in connection with the accompanying drawings, in which:

Fig. 1 is a side elevational view, partly in section and partly in outline, of the several parts of a structure embodying the invention; Fig. 2 is an end elevation of the same; Fig. 3 is a plan view of the same; Fig. 4 is a portion of a sectional view taken on the line 4—4 of Fig. 3; Fig. 5 is a view similar to Fig. 4 with alternate port connections for adjusting the device; Fig. 6 is a fragmentary view in outline taken on the line 6—6 of Fig. 3; Figs. 7 and 8 are fragmentary sectional views taken on the lines 7—7 and 8—8, respectively, of Fig. 6; Figs. 9, 10 and 11 are respective views of several forms of gaskets which may be used with the invention; Fig. 12 is a view of the casing structure taken on the lines 12—12 of Fig. 1; Fig. 13 is a view taken on the lines 13—13 of Fig. 1; Fig. 14 is a view taken on the lines 14—14 of Fig. 13; Fig. 15 is a view taken on the lines 15—15 of Fig. 13; and Fig. 16 is a diagrammatic view, chiefly in section, of the device shown in Fig. 1.

As shown in Fig. 1 of the drawings, the load brake mechanism comprises a mounting bracket 1, which may be suitably mounted on a spring-supported portion of a vehicle, such as the truck bolster, by means not shown, a strut cylinder device 2 which may be mounted on the mounting bracket 1 by mean of studs 3 anchored in said bracket, and a gasket 4 interposed therebetween. The several parts are shown separated solely for illustrative purposes and when operatively mounted are secured together as shown in Fig. 3 by nuts 5 tightened on studs 3.

The strut cylinder device 2 comprises a vertically disposed cylinder casing, which may be supported on a spring-borne portion of the vehicle (not shown), in which casing is slidably mounted a control piston 6 having a piston stem 7 which extends through and is slidably guided in a non-pressure head 8 pressed into the upper end of the cylinder casing as viewed in Fig. 1. An annular recess 9 formed in non-pressure head 8 contains a sealing ring 10 which encircles the piston stem 7 making sealing connection between said stem and non-pressure head 8, thereby closing off communication of the interior of the casing from the atmosphere for reasons which will appear more fully later. A skirt 11 formed of resilient composition material is snapped into a suitable groove around the exterior periphery of the piston stem 7 for the purpose of preventing moisture and dirt from entering the casing when said stem is in its normal, inoperative position. The lower end of the cylinder casing is closed by a cap member 12 secured to the casing by bolts 13 and making sealing contact therewith by means of a gasket 14.

At one side of the control piston 6 is a pressure chamber 15 which is open to a supply passage 16 and at the other side is a non-pressure chamber 17 which is open to atmosphere by way of a breather passage 18 which may be filled with a straining material 19. A sealing ring 61 is mounted in an annular recess 62 formed in the periphery of piston 6 for preventing leakage of fluid under pressure from chamber 15 to chamber 17. Contained in chamber 17 is a coiled spring 20, which engages the non-pressure head 8 and the piston 6 so as to constantly urge the piston downwardly toward the position in which it is shown in Fig. 1.

As best seen in Figs. 12, 13, 14 and 15, the strut cylinder casing is provided with a plurality of passages 21, 22 and 23, each of which extends horizontally from a mounting face 24 to its respective pair of ports 25, 26 and 27 which open into the non-pressure chamber 17. As will appear more fully later, each pair of ports (Fig. 14) corresponds to a certain maximum load condition of braking for a class of truck springs having a certain degree of deflection per unit of weight, within a selected range, and may condition the selector valve device described in the aforementioned patent application accordingly. In a similar manner, a plurality of passages 28, 29 and 30 with their connected pairs of ports 31, 32 and 33 are provided in the cylinder casing for braking a partially loaded vehicle.

In Fig. 6 there is shown an enlarged view of a mounting face 34 of the mounting bracket 1 having openings therein which are located so as to register individually with certain of the openings in the mounting face 24 (Fig. 12) of the strut cylinder device 2 as determined by the openings in the intervening gasket designated generally at 4 in Fig. 1. Thus, passages 35, 36 and 37 in face 34 of the bracket 1 are arranged to register with passages 21, 22 and 23, respectively, in face 24 of cylinder device 2 and passages 38, 39 and 40 in face 34 are arranged to register with passages 28, 29 and 30, respectively, in face 24. As best seen in Fig. 7, passages 35, 36 and 37 are connected through a diagonally disposed, as viewed in Fig. 6, common passage 41 to a horizontally disposed passage 42 leading to the side opposite to face 34 and terminating in a hose nipple 43. As shown in Fig. 8, passages 38, 39 and 40 are connected through a diagonally disposed common passage 44 to a horizontal passage 45 leading to the side opposite to face 34 and terminating at a hose nipple 46 and passage 38 is connected to same by a vertically disposed passage 47 as viewed in Fig. 6. In Fig. 6 passages 35, 36, 37, 41 and 42 are circumscribed by an irregularly broken line designated by the numeral 48 to indicate their common connection while passages 38, 39, 40, 44 and 45 are circumscribed by a short dash line 49 to indicate their common connection.

When it is desired to mount the strut cylinder device 2 to a sprung, or spring-supported, portion of a vehicle in which the total downward displacement of the vehicle body in relation to an unsprung portion for effecting a change from a condition for braking an empty vehicle to a condition for braking a loaded vehicle is not less than ¾ of an inch and not more than one inch, a gasket 50 shown in Fig. 9 may be installed at 4 in Fig. 1. With gasket 50 properly secured in place the legend "¾ to 1" will be open to view to advise everyone of the range of spring deflection in which the device is adapted to operate.

In operation, when fluid under pressure is supplied to strut cylinder device 2 by operation of the load compensating brake equipment disclosed in the aforesaid copending patent application, fluid under pressure will flow through a hose nipple 51 (Fig. 3), a passage 52 (Fig. 6), an opening 53 in gasket 50 and passage 16 in said device to pressure chamber 15. When pressure of fluid in chamber 15 becomes sufficient to overcome the opposing force of spring 20, piston 6 will move upwardly until a contact member 54 mounted on the upper end of piston stem 7 engages a stop member (not shown) mounted on an unsprung portion of the vehicle to thereby gauge the weight of the load on the vehicle. When piston 6 passes ports 31 in its upward movement, fluid under pressure supplied to chamber 15 will flow through said ports, passage 28, an opening 55 in gasket 50, passages 38, 47, 44 and 45 in bracket 1 to hose nipple 46 (Figs. 3, 8), whence it will flow to the aforesaid selector valve device to condition the associated brake equipment for braking a partially loaded vehicle. Should the piston 6 pass the ports 25, as in the case of the vehicle being fully loaded, fluid under pressure will flow from chamber 15 through said ports, passage 21, an opening 56 in gasket 50, passages 35, 41 and 42 in bracket 1 to hose nipple 43 (Fig. 7), whence it will flow to the aforesaid selector valve device to condition the associated brake equipment for braking a fully loaded vehicle.

Similarly, when it is desired to provide a strut cylinder device which will operate on a vehicle having a total vertical displacement of the vehicle body of 1¼ to 1½ inches in going from position for an empty vehicle to position for a fully loaded vehicle, a gasket 57 (Fig. 10) may be provided at 4 in Fig. 1. During the load adjusting operation of the aforementioned load compensating brake equipment, fluid under pressure supplied to chamber 15 will move piston 6 upwardly until contact member 54 engages a stop member on the unsprung part of the vehicle (not shown). If the piston 6 passes ports 32, fluid under pressure in chamber 15 will flow through said ports, passage 29, an opening 58 in gasket 57, passages 39, 44 and 45 to hose nipple 46 (Fig. 8). Thus, the aforesaid selector valve device will be conditioned to brake a partially loaded vehicle in the same manner as previously described when piston 6 passed ports 31 with gasket 50 mounted at 4 in Fig. 1. When piston 6 passes ports 26 fluid under pressure will flow from chamber 15 through said ports, passage 22, an opening 59 in gasket 57, passages 36, 41 and 42 in the bracket 1 to nipple 43 and thence to the brake equipment to condition same for braking a loaded vehicle as before described.

Likewise when the total displacement of the vehicle body of 1¾ to 2 inches occurs in loading a vehicle to capacity, a gasket 60 having openings 61 and 62 therein will effect connections of passages 30 and 23 of strut cylinder device 2 with passages 40 and 37 of pipe bracket 1, respectively, for supplying fluid under pressure to nipples 46 and 43, respectively, and thereby condition said brake equipment for braking either a partially loaded or fully loaded vehicle, respectively.

When testing the load compensating brake equipment described in the aforesaid copending application it is customary to supply fluid under pressure to the pressure chamber 15 for the purpose of actuating the piston 6 upwardly until the stem 54 contacts an unsprung portion of the vehicle (not shown). If the vehicle is loaded, the upward movement of the piston 6 will be sufficient to connect one pair, or all of the ports 25, 26 and 27 to pressure chamber 15. However, if the vehicle is empty, the strut cylinder device 2, being carried by a sprung portion of the vehicle, will be closer vertically and consequently piston 6 will not be permitted to pass the ports 25, 26 and 27. Thus it is not possible to conduct tests for an empty vehicle.

In order to overcome this difficulty, it is a feature of my invention to provide a blanking plate 65 on a face 66 on the top of the mounting bracket 1, to which face an atmospheric passage 67 and chambers 15 and 17 are connected as hereinafter described for the purpose of determining the connection of fluid under pressure from the aforesaid selector valve device to the strut cylinder device 2. With plate 65 in its normal position as shown in Figs. 4 and 16 non-pressure chamber 17 is connected to atmosphere by way of passage 18, an opening 68 in gaskets 50, 57 or 60, a passage 69 in bracket 1, cavity 70 in said plate and passage 71 and pressure chamber 15 is connected to supply passage 52 by way of passage 16 and opening 53 in gasket 4. With plate 65 in position for testing the equipment on an empty vehicle, supply passage 52 will be connected to non-pressure chamber 17 by way of passage 67, cavity 70 in plate 65, passages 69, opening 68 in the gasket, strainer 19 and passage 18. Fluid under pressure in supply passage 52 will then flow to any one of passages 21, 22 and 23 as determined by the gasket at 4 in the same manner as if connected to chamber 15 by movement of piston 6 past ports 31, 32 or 33 to condition the selector valve device of the aforesaid copending application for braking a loaded vehicle.

Summary

From the foregoing, it will be seen that with this invention I have provided novel, improved means for determining the loaded condition of a vehicle and conditioning a loaded compensating brake equipment accordingly, and a novel method for effecting the correlation between the selector valve device of a load compensating brake equipment and the truck spring characteristics by selection of the one of several gaskets which will make the proper port connection between a strut cylinder device and its mounting bracket to conform the operation of the selector valve device to the deflection of the load supporting springs. Provision is also made in accordance with my invention for testing the load compensating equipment on an empty vehicle by changing a blanking plate to enable supply of fluid under pressure to the non-pressure chamber in the strut cylinder device, and thereby to the selector valve device in the same manner as if the vehicle were loaded.

Having now described the invention, what I claim is new and desire to secure by Letters Patent, is:

1. In a load compensating fluid pressure brake equipment for a vehicle having a sprung portion and an unsprung portion and of the type using the deflection of the springs supporting the sprung portion as a gauge for conditioning said equipment for braking according to the load on the vehicle, a load brake mechanism adapted to condition said equipment according to the vertical distance between the sprung and unsprung portions of the vehicle, comprising, a mounting bracket carried by a sprung portion of the vehicle and having a mounting face with a plurality of ports therein, one group of ports being connected to a hose nipple for indicating a partially loaded condition of the vehicle and another group of ports being connected to another hose nipple for indicating a fully loaded condition of the vehicle, a strut cylinder device mounted on said mounting bracket and comprising a casing having a mounting face and piston means operably mounted in said casing having a non-pressure chamber at one side and a pressure chamber at the other side and movable into contact with said unsprung portion in response to pressure of fluid in said pressure chamber, said casing having a plurality of passages extending from said non-pressure chamber to its mounting face and arranged to be serially connected to said pressure chamber upon movement of said piston and to be in substantial alignment with said ports when said strut cylinder device is mounted in position on said mounting bracket, a gasket adapted to be interposed between the mounting faces of said strut cylinder device and said mounting bracket so as to connect a particular one of said passages to one of said groups and another particular passage to the other of said groups, the particular passages occupying the same relative position with respect to piston movement in each of said groups, and a blanking plate adapted to normally connect said non-pressure chamber to atmosphere and adapted to be mounted in another position in which the atmospheric connection is closed off and said non-pressure chamber is connected to a source of supply of fluid under pressure.

2. A load responsive mechanism for determining the amount of load supported on the springs of a vehicle by using the deflection of the load supporting springs as a gauge, comprising, in combination, a strut cylinder device comprising a casing having a mounting face and a piston reciprocably mounted in said casing and having a pressure chamber at one side and a non-pressure chamber at the other side, the degree of movement of said piston being arranged to increase as the load on said springs increases, said casing having a plurality of passages extending from said non-pressure chamber to said mounting face and arranged to be serially connected to said pressure chamber upon movement of said piston by fluid pressure in said pressure chamber, a mounting bracket for said strut cylinder device having a mounting face with a plurality of ports therein arranged so as to be in substantial alignment with said passages when said strut cylinder device is mounted in position, said ports being divided into one interconnected group for registering the shorter range of movement of said piston and another interconnected group for registering the longer range of movement of said piston, and a gasket adapted to be interposed between the mounting faces of said strut cylinder device and said mounting bracket so as to connect a particular one of the passages to one of said groups and another particular passage to the other of said groups, the particular passages occupying the same relative positions with respect to piston movement in each of said groups and the range of piston travel between the particular passages being selected by selection of a gasket corresponding to the total deflection of the vehicle springs under load.

3. A load brake mechanism for determining the amount of load supported on the springs of a vehicle, in combination, a strut cylinder device comprising a casing having a mounting face and a piston reciprocably mounted in said casing having a pressure chamber at one side and a non-pressure chamber at the other side, said casing having a plurality of passages extending from said non-pressure chamber to said mounting face and arranged to be serially connected to said pressure chamber upon movement of said piston by fluid pressure in said pressure chamber, a mounting bracket for said strut cylinder device having a mounting face with a plurality of ports therein arranged so as to be in substantial alignment with said passageways when said strut cylinder device is mounted in position, said ports being divided into one interconnected group for registering the shorter range of movement of said piston and another interconnected group for registering the longer range of movement of said piston, one hose nipple mounted on said mounting bracket adapted to be connected to a supply of fluid under pressure and leading to a port connected to said pressure chamber, a second hose nipple mounted in said bracket and connected to said one of said groups and adapted to be connected to said load compensating brake equipment for conditioning same for braking a partially loaded vehicle, a third hose nipple mounted in said bracket and connected to the other of said groups, and a gasket adapted to be interposed between the mounting faces of said strut cylinder device and said mounting bracket so as to connect a particular one of the passages to one of said groups and another particular passage to the other of said groups, the particular passages occupying the same relative positions with respect to piston movement in each of said groups and the range of piston travel between the particular passages being selected by selection of a gasket corresponding to the total deflection of the vehicle springs under load.

4. In a load compensating fluid pressure brake equipment having one control conduit for providing braking power for a partially loaded vehicle and a second control conduit for providing braking power for a fully loaded vehicle, a load brake mechanism for determining the amount of load supported on the springs of the vehicle and conditioning said load compensating brake accordingly, comprising, a strut cylinder device comprising a casing having a mounting face and a piston reciprocably mounted in said casing having a pressure chamber at one side and a non-pressure chamber at the other side, said casing having a plurality of passages extending from said non-pressure chamber to said mounting face and arranged to be serially connected to said pressure chamber upon movement of said piston by fluid pressure in said pressure chamber, a mounting bracket for said strut cylinder device having a mounting face with a plurality of ports therein arranged so as to be in substantial alignment with said passageways when said strut cylinder device is mounted in position, said ports being divided into one interconnected group for registering the shorter range of movement of said piston and another interconnected group for registering the longer range of movement of said piston, one hose nipple mounted in said mounting bracket and leading to a port connected to said pressure chamber and adapted to be connected to a supply of fluid under pressure, a second hose nipple mounted on said bracket and connected to said one of said groups and adapted to be connected to said one control conduit, and a third hose nipple mounted on said bracket and adapted to be connected to said second control conduit, and a blanking plate having a normal position connecting said non-pressure chamber to the atmosphere and adapted to be mounted in another position in which said non-pressure chamber is blanked off from atmosphere and connected to said one hose nipple, and a gasket adapted to be interposed between the mounting faces of said strut cylinder device and said mounting bracket so as to connect a particular one of the passages to one of said groups and another particular passage to the other of said groups, the particular passages occupying the same relative positions with respect to piston movement in each of said groups.

5. In a load compensating fluid pressure brake equipment of the type using the deflection of vehicle load supporting springs as a gauge by gradually limiting the movement of a load measuring element as the load on the vehicle is lessened, said equipment having one control conduit for providing braking power for a partially loaded vehicle and a second control conduit for providing braking power for a fully loaded vehicle, a load brake mechanism comprising, a strut cylinder device comprising a casing having a mounting face with a plurality of ports therein, a piston carrying said load measuring element reciprocably mounted in said casing and dividing same into a pressure chamber at one side and a non-pressure chamber at the other side, said casing having a plurality of passageways extending from said non-pressure chamber to said ports respectively and arranged to be serially connected to said pressure chamber by movement of said piston in response to pressure of fluid in said pressure chamber, a mounting bracket for said strut cylinder device having a mounting face with a plurality of ports therein arranged to be in substantial alignment with the ports in said face of said strut cylinder device when same is mounted on said bracket, said ports in said bracket being equally divided into one group having a common connection for limited movements of said piston and adapted to be connected to said one control conduit and another group having a common connection corresponding to longer movement of said piston and adapted to be connected to said other control conduit, and a gasket adapted to be interposed between the mounting faces of said strut cylinder device and said mounting bracket so as to connect a particular one of the passageways to one of said groups and another particular passageway to the other of said groups, the particular passageways occupying the same relative position with respect to piston movement in each of said groups.

6. In a load brake mechanism for determining the amount of load supported on the springs of a vehicle by using the deflection of the load supporting springs as a gauge, the combination of a universal strut cylinder device having a piston with a pressure chamber at one side and a non-pressure chamber at the other side and a port which indicates a loaded condition of the vehicle when supplied with fluid under pressure, said piston being adapted to register the degree of spring deflection on the vehicle and to indicate the loaded condition of the vehicle when said piston opens said pressure chamber to said port, a mounting bracket adapted to support said strut cylinder device and to connect a supply of fluid under pressure to said pressure chamber, and a blanking plate having a normal position connecting said non-pressure chamber to the atmosphere and adapted to be mounted in another position in which said non-pressure chamber is blanked off from atmosphere and said supply is connected to said non-pressure chamber to establish the same port connection for testing the braking operation of a loaded vehicle in the same manner as that established when said piston moves to a position indicative of a fully loaded vehicle.

References Cited in the file of this patent
UNITED STATES PATENTS

| | | |
|---|---|---|
| 1,782,567 | Farmer | Nov. 25, 1930 |
| 2,009,840 | Farmer et al. | July 30, 1935 |
| 2,155,225 | Hewitt | Apr. 18, 1939 |
| 2,661,245 | Laber | Dec. 1, 1953 |